(12) United States Patent
Lauster

(10) Patent No.: US 11,259,171 B2
(45) Date of Patent: Feb. 22, 2022

(54) TECHNIQUES FOR ROUTING A REGISTRATION REQUEST OF A ROAMING USER EQUIPMENT BY A BRIDGE ENTITY

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/768,086

(22) PCT Filed: Nov. 6, 2018

(86) PCT No.: PCT/EP2018/080218
§ 371 (c)(1),
(2) Date: May 29, 2020

(87) PCT Pub. No.: WO2019/120729
PCT Pub. Date: Jun. 27, 2019

(65) Prior Publication Data
US 2020/0322780 A1      Oct. 8, 2020

(30) Foreign Application Priority Data
Dec. 22, 2017   (EP) .................................... 17210131

(51) Int. Cl.
*H04W 8/12*        (2009.01)
*H04W 76/27*       (2018.01)
(Continued)

(52) U.S. Cl.
CPC .......... *H04W 8/12* (2013.01); *H04L 61/2015* (2013.01); *H04W 48/16* (2013.01); *H04W 60/00* (2013.01);
(Continued)

(58) Field of Classification Search
CPC ....... H04W 8/12; H04W 76/27; H04W 48/16; H04W 60/00; H04W 80/02; H04W 84/042; H04L 61/2015
See application file for complete search history.

(56) References Cited

U.S. PATENT DOCUMENTS

2018/0288582 A1*  10/2018  Buckley ................ H04W 48/14
2020/0112898 A1*  4/2020   Ramle .................. H04W 36/08
2021/0176816 A1*  6/2021   Palanisamy ............. H04W 4/70

FOREIGN PATENT DOCUMENTS

WO   WO 2006039623 A2   4/2006
WO   WO 2017113100 A1   7/2017

OTHER PUBLICATIONS

Penttinen, et al., "Data Networks," *The Telecommunications Handbook: Engineering Guidelines for Fixed, Mobile and Satellite Systems* (Feb. 16, 2015). XP055453539.

* cited by examiner

*Primary Examiner* — Wayne H Cai
(74) *Attorney, Agent, or Firm* — Leydig, Voit & Mayer, Ltd.

(57) ABSTRACT

A 5G communication system includes at least one visited network slice; a home network slice; and a bridge entity. The at least one visited network slice comprises a visited radio access network (RAN) entity. The home network slice comprises a home Access and Mobility Management Function (AMF) entity. The bridge entity coupled between the visited RAN entity and the home AMF entity, wherein the bridge entity is configured to route a registration request message of a roaming user equipment (UE) received from the visited RAN entity to the home AMF entity.

10 Claims, 4 Drawing Sheets

(51) Int. Cl.
*H04L 61/5014* (2022.01)
*H04W 48/16* (2009.01)
*H04W 60/00* (2009.01)
*H04W 80/02* (2009.01)
*H04W 84/04* (2009.01)

(52) U.S. Cl.
CPC ........... *H04W 76/27* (2018.02); *H04W 80/02* (2013.01); *H04W 84/042* (2013.01)

US 11,259,171 B2

TECHNIQUES FOR ROUTING A REGISTRATION REQUEST OF A ROAMING USER EQUIPMENT BY A BRIDGE ENTITY

CROSS-REFERENCE TO PRIOR APPLICATIONS

This application is a U.S. National Phase application under 35 U.S.C. § 371 of International Application No. PCT/EP2018/080218, filed on Nov. 6, 2018, and claims benefit to European Patent Application No. EP 17210131.3, filed on Dec. 22, 2017. The International Application was published in English on Jun. 27, 2019 as WO 2019/120729 A1 under PCT Article 21(2).

TECHNICAL FIELD

The invention relates to techniques for routing a registration request message of a roaming user equipment from a visited network slice to a home network slice by using a bridge entity, in particular an intermediate or central bridge entity. The invention further relates to a communication system, in particular a 5G communication system and a method using such a routing mechanism.

BACKGROUND

Operators worldwide are currently preparing for the transition to 5G networks. To support the wide range of services planned for 5G, a new core network known as Next-Generation Core or NG Core is planned. Its structure is described, for example, in the technical specification TS 23.501 (V1.5.0) of 3GPP. It specifies requirements for designing and operating a 5G service-oriented core network.

The service-oriented 5G core network is based on the premise that 5G shall support very different services with very different performance requirements. Three different service categories for 5G are identified: 1) Enhanced Mobile Broadband (eMBB), 2) Massive machine-type communication (mMTC, also known as IoT, Internet of Things) and 3) Ultra-Low Latency (UR-LLC) communication.

This includes use cases or application scenarios such as industrial control, augmented reality (AR) or augmented reality/virtual reality (VR) and networked cars. The goal is to use end-to-end network slices to map and support these diverse services and technologies on a physical network infrastructure. In this way, operators can operate new services in foreign network sectors and insert their networks into new industrial value chains.

When starting operation of the communication terminal, i.e. the mobile terminal, the machine terminal such as of the self-driven car or drone, also denoted herein as user equipment (UE), currently a complex procedure is necessary when the UE is located in the visited network or in an external communication network. This procedure is necessary in order to fetch the subscriber-specific data of the UE from the home communication network, also denoted as home PLMN (Public Land Mobile Network) and to inform the UE. These subscriber-specific data of the UE can for example include registration and/or authentication data of the UE in the visited PLMN, such as identification and telephone number, e.g. IMSI (International Mobile Subscriber Identity) or IMEI (International Mobile Equipment Identity) or SIM ID (Subscriber Identity Module Identity). Further, for logging into the visited network, also referred to as visited PLMN, allowed capabilities and/or policies of the visited PLMN, e.g. network technology, support for certain services, etc. are required.

SUMMARY

In an exemplary embodiment, the present invention provides a 5G communication system. The 5G communication system comprises: at least one visited network slice; a home network slice; and a bridge entity. The at least one visited network slice comprises a visited radio access network (RAN) entity. The home network slice comprises a home Access and Mobility Management Function (AMF) entity. The bridge entity coupled between the visited RAN entity and the home AMF entity, wherein the bridge entity is configured to route a registration request message of a roaming user equipment (UE) received from the visited RAN entity to the home AMF entity.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
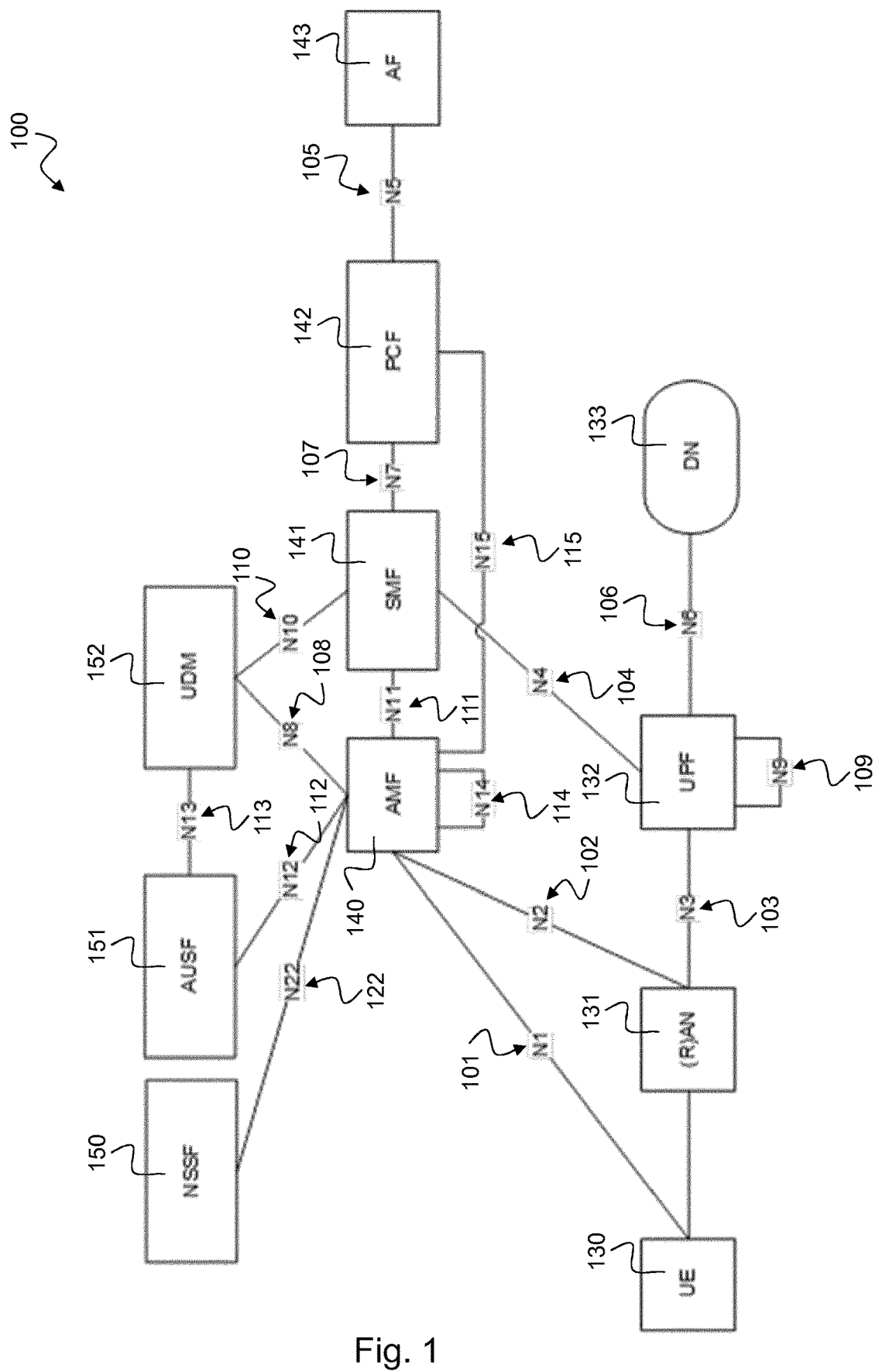
FIG. 1 shows a schematic diagram illustrating a system architecture of a 5G communication network 100.

Exemplary embodiments of the present invention speed up, simplify and increase security of the connection procedure of the UE in the visited PLMN, and thus increase the performance and flexibility of communication, especially when roaming in the above described 5G communication networks.

Exemplary embodiments of the present invention further introduce a new system architecture for simplifying the 5G roaming architecture.

Exemplary embodiments of the invention use a bridge entity or bridge network instance which couples the visited PLMN with the home PLMN. The functionality of such a bridge entity is described in this disclosure.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network or communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

The communication networks presented below may include various technologies and network standards, for example according to the 5G system architecture. This includes the concept of network slicing. Network slicing is a form of virtual network architecture that uses the same principles as software-defined networking (SDN) and network functions virtualization (NFV) in fixed networks. SDN and NFV are used to provide greater network flexibility by partitioning traditional network architectures into virtual elements that can be linked together, even through software.

Network slicing allows multiple virtual networks to be created on a common physical infrastructure. The virtual networks are then adapted to the specific needs of applications, services, devices, customers or operators.

Each virtual network (network slice) comprises an independent set of logical network functions that support the needs of the particular use case, where the term "logical" refers to software.

Each of these virtual networks or network slices is optimized to provide the resources and network topology for the particular service and traffic using the corresponding segment. Features such as speed, capacity, connectivity, and coverage are assigned to meet the specific needs of each use case, but functional components can also be shared across different network slices.

Each network slice can be completely isolated, so that no network slice can disturb the traffic in another network slice. This reduces the risk of introducing and operating new services and also supports migration as new technologies or architectures can be started on isolated slices. It also affects security, because if a cyber-attack breaks a slice, the attack is contained and cannot spread beyond that slice.

Each network slice is configured with its own network architecture, engineering mechanism, and network deployment. To do this, each network slice can receive management capabilities that can be controlled by the network operator or the customer depending on the application. The network slices can be independently managed and orchestrated.

According to a first aspect the invention relates to a communication system, in particular a 5G communication system, comprising: at least one visited network slice comprising a visited network access entity, in particular a visited radio access network (RAN) entity; a home network slice comprising a home network access entity, in particular a home Access and Mobility Management Function (AMF) entity; and a bridge entity coupled between the visited network access entity and the home network access entity, wherein the bridge entity is configured to route a registration request message of a roaming user equipment (UE) received from the visited network access entity to the home network access entity.

By using such a bridge entity in the communication system, the UE's connection procedure in the visited PLMN can be accelerated since the UE can obtain all relevant data via the bridge entity from the home network slice to establish the roaming communication over the visited network. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks. In particular for 5G communication networks, the system architecture for the roaming scenario can be simplified since the new bridge entity can cache all required data, e.g. subscriber data, etc. thereby replacing all other communications required for obtaining the roaming data.

In an exemplary implementation form of the communication system, the bridge entity is a central entity located at a central location of the communication system; or the bridge entity is an intermediate entity located between the at least one visited network slice and the home network slice.

This provides the advantage that the bridge entity is outside the visited and home network slices and can be used as a central database or central server to provide the necessary routing information.

In an exemplary implementation form of the communication system, the visited network access entity comprises a routing table configured to forward the registration request message based on an identity (UE ID) of a UE comprised in the registration request message and/or a public land mobile network identity (PLMN ID) derived from the UE ID.

This provides the advantage that the routing table can be used to store the necessary information about the plurality of UEs located within the visited network slice and which UEs are located in their home network and which UEs are roaming UEs. By using this information from the routing table, the roaming process can be accelerated since the roaming UEs can be efficiently routed outside the visited network slice.

In an exemplary implementation form of the communication system, the routing table comprises at least one internal route for routing messages from UEs that are configured for the at least one visited network slice and an external route for routing messages from UEs that are not configured for the at least one visited network slice.

This provides the advantage that discrimination between UEs belonging to the visited network and (roaming) UEs belonging to the home network can be facilitated.

In an exemplary implementation form of the communication system, the internal route comprises a route within the at least one visited network slice, in particular a route to a visited AMF entity of the at least one visited network slice; and the external route comprises a route to the bridge entity.

This provides the advantage that the AMF entity of the visited network slice can process all requests from UEs belonging to the visited network while requests from UEs belonging to the home network can be efficiently processed by the AMF entity of the home network to which the bridge entity routes these requests.

In an exemplary implementation form of the communication system, the routing table comprises a first internal route for routing messages from UEs that are configured for a first visited network slice of the at least one visited network slice and a second internal route for routing messages from UEs that are configured for a second visited network slice of the at least one visited network slice, wherein the first internal route is different from both, the second internal route and the external route.

This provides the advantage that fast processing for requests directed to different network slices of the visited network can be achieved.

In an exemplary implementation form of the communication system, the bridge entity comprises a routing table configured to forward the registration request message based on the identity (UE ID) of the UE and/or based on the PLMN ID to the home network slice.

This provides the advantage that registration requests from the roaming UE can be efficiently and fast forwarded or routed to their home network slice. Hence reaction times for the roaming procedure can be decreased and the whole routing process is increased.

In an exemplary implementation form of the communication system, the bridge entity is configured to route the registration request message based on a network address, in particular an IP address or a media access control (MAC) address of the roaming user equipment (UE).

This provides the advantage that the bridge entity can be implemented as a common router which routes IP addresses or MAC addresses. This reduces computational complexity of the routing solution.

In an exemplary implementation form of the communication system, the bridge entity provides a database service, in particular a domain name service (DNS) or a dynamic host configuration protocol (DHCP) service, that is configured to resolve the registration request message of the roaming user equipment (UE) providing an address of the corresponding home network slice.

This provides the advantage that by using a standard DNS server or DHCP server, the bridging task of the bridge entity can be efficiently implemented.

In an exemplary implementation form of the communication system, the bridge entity is configured to provide a mapping of routable addresses of at least one home network slice and at least one visited network slice which are coupled to the bridge entity.

This provides the advantage that for each visited network slice a route can be specified to the corresponding home network slice. This facilitates the roaming procedure.

In an exemplary implementation form of the communication system, the bridge entity comprises functionality of a visited AMF entity of the at least one visited network slice and/or is collocated with the visited AMF entity.

This provides the advantage that the bridge entity can be implemented together with the AMF entity which simplifies the implementation and reduces latency.

In an exemplary implementation form of the communication system, the bridge entity comprises data caching functionality, in particular for caching subscriber data received from the home network slice.

This provides the advantage that the subscriber data stored in the data cache is available when required. Latency for accessing the subscriber data can hence be reduced.

According to a second aspect, the invention relates to a bridge entity connectable between a plurality of visited network slices and a plurality of home network slices, the bridge entity comprising: a routing table configured to provide a plurality of routes between the visited network slices and the home network slices; and a processor configured to route a registration request message of a roaming user equipment (UE) received from a visited network slice of the plurality of visited network slices to a corresponding home network slice of the plurality of home network slices based on the routing table.

Such a bridge entity can accelerate the UE's connection procedure in the visited PLMN since the UE can obtain all relevant data via the bridge entity from the home network slice to establish the roaming communication over the visited network. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks. In particular for 5G communication networks, the system architecture for the roaming scenario can be simplified since the new bridge entity can cache all required data, e.g. subscriber data, etc. thereby replacing all other communications required for obtaining the roaming data.

In an exemplary implementation form of the bridge entity, the processor is configured to determine the corresponding home network slice based on an identity (UE ID) of a UE, in particular a network address of the UE, comprised in the registration request message and/or a public land mobile network identity (PLMN ID) derived from the UE ID.

This provides the advantage that the processor can efficiently determine the corresponding home network slice as all information required can be obtained by the registration request message.

According to a third aspect, the invention relates to a visited network access entity, in particular a radio access network (RAN) entity of a visited network slice, the visited network access entity comprising: a routing table comprising at least one internal route for routing messages from non-roaming UEs to a network entity of the visited network slice and an external route for routing messages from roaming UEs to a bridge entity; and a processor configured to forward an incoming registration request message from a UE based on looking up the routing table with respect to an identity (UE ID) of the UE comprised in the registration request message and/or a public land mobile network identity (PLMN ID) derived from the UE ID.

Such a visited network access entity can accelerate the UE's connection procedure in the visited PLMN since the UE can obtain all relevant data via the visited network access entity and the bridge entity from the home network slice to establish the roaming communication over the visited network. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks.

According to a fourth aspect, the invention relates to a communication system, in particular a 5G communication system, comprising: at least one visited network slice comprising a visited network access entity according to the third aspect; at least one home network slice; and a bridge entity according to the second aspect, configured to route a registration request message of a roaming user equipment (UE) received from the at least one visited network slice to the at least one home network slice according to the routing table.

Such a communication system can accelerate the UE's connection procedure in the visited PLMN since the UE can obtain all relevant data via the visited network access entity and the bridge entity from the home network slice to establish the roaming communication over the visited network. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks.

According to a fifth aspect, the invention relates to a method for routing a registration request message from a roaming user equipment (UE), the method comprising: forwarding a registration request message from a roaming user equipment (UE) by a visited network access entity, in particular a visited radio access network (RAN) entity, to a bridge entity; and routing the registration request message by the bridge entity to a home network access entity of a home network slice of the roaming UE.

Such a method can accelerate the UE's connection procedure in the visited PLMN since the UE can obtain all relevant data via the visited network access entity and the bridge entity from the home network slice to establish the roaming communication over the visited network. Hence, the UE no longer needs to query a variety of network elements using a variety of different interfaces, which may not even exist in the visited network, and possibly make the construction of the roaming connection fail. This increases the performance and flexibility of the communication, especially when roaming in 5G communication networks.

According to a sixth aspect the invention relates to a computer program product comprising program code for performing the method according to the first aspect of the invention, when executed on a computer or a processor.

Embodiments of the invention can be implemented in hardware and/or software.

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The following describes network entities such as network access entities and functions of such a network access entity or radio access network (RAN) entities. The network access entity enables access and mobility management in the communication network. Via the network access entity, communication terminals with their identity (UE ID) can register in the communication network and receive the permission to set up a communication connection. For example, in the 5G communication network, the network access entity may be an AMF (Access and Mobility Management Function) representing the access and mobility management function. This manages the access and mobility control. The AMF may also include network slice selection functionality. For wireless access, mobility management is not needed. The network access entity may be, for example, an MME (mobility management entity) in the 4G communication network. The MME is a network component of the LTE (Long Term Evolution) mobile radio standard, which performs the functions of paging to set up calls and generally communication links as well as signaling for control purposes. The MME forms the link between core network and access network. The MME manages the locations of all mobile communication terminals in the radio cells connected to it. In the LTE system, several cells are usually combined to form a tracking area. The management area of an MME can be divided into several tracking areas. The radio access network (RAN) entity as described in the following, e.g. a base station, an Access Point or another kind of radio cell, may also be denoted as network access entity.

The radio access network (RAN) is part of a mobile telecommunication system. It implements a radio access technology (RAT). Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), etc. RAN functionality is typically provided by a RAN entity, e.g. a silicon chip, residing in both the core network as well as the user equipment. Examples of radio access network types are GERAN (GSM EDGE Radio Access Network), the GSM (Global System for Mobile Communications) radio access network including EDGE packet radio services, UTRAN (UMTS Terrestrial Radio Access Network), the UMTS (Universal Mobile Telecommunications Service) radio access network, E-UTRAN (Evolved UTRAN), the LTE radio access network and the 5G RAN. The RAN entity can for example include a base station, e.g. a NodeB or and eNodeB or a 5G capable radio cell.

The network access entity further provides the technical function of first establishing a security relationship with a previously unknown security device, in order to then be able to install security elements (keys) in the device itself and in the network application function (NAF) of the network access function. For example, the Diameter and Hypertext Transfer Protocol (http) protocols can be used. For example, SOAP (Simple Object Access Protocol) may be used between BSF (Bootstrapping Server Function) and NAF instead of diameter.

Involved in the maintenance of such a generic security relationship are the following functional elements: terminal, e.g. a mobile phone, i.e. User Equipment (UE), which wants to use a particular service, application server that provides the service, e.g. for Mobile TV, VoLTE (Voice over LTE), VoIP (Voice over Internet Protocol), FTP (File Transfer Protocol) data transfer, media streaming, Internet browsing, etc., Network Application Function (NAF), the network access entity itself, which establishes a security relationship between UE and NAF and a database of the home network, e.g. Home Subscriber Server (HSS) or UDR (unified data repository) of the (mobile) network provider, which manages the respective user-specific profiles of its terminal users.

The network access entity network access feature is consulted by the application server (NAF) after a terminal has requested service access from it. Since the application server does not yet know the terminal at this time, it first refers this to the network access function. The terminal and the network access function now authenticate to each other; this can be done, for example, by means of the AKA (Authentication and Key Agreement) protocol and by inquiring the network access function to the Home Subscriber Server (HSS) or the UDR database of the home network. Subsequently, the network access function and the terminal (UE) agree on a session key to be used for encrypted data exchange with the application server (NAF). If the terminal now again turns to the application server, it can obtain both the session key and subscriber-specific data from the network access function and start the data exchange with the terminal (UE). The appropriate session keys are used for cryptographic protection.

The security relationship itself between terminal and network access entity never leaves the sovereignty of the (mobile) network operator, only data derived from this security relationship (key) can be queried and used by applications.

In particular, the network entities described in this disclosure are intended to facilitate the establishment of the roaming connection of the communication terminal, as described below in this disclosure.

FIG. 1 shows a schematic diagram illustrating a system architecture of a 5G communication network 100. The 5G system architecture 100 comprises the network functions illustrated in the individual blocks of FIG. 1.

The UE (User Equipment) block 130 represents the user equipment or client terminal or mobile communication device which can be operated by the subscriber to initiate communication in the 5G network, i.e. starting a communication (mobile originating, MO) or accepting (mobile terminating, MT). The UE can also initiate communication without user interaction, e.g. it can be a machine terminal, e.g. for a car or a robot or other device.

The block (R)AN ((radio) access network) 131 represents the (radio) access network by which the UE 130 obtains access to the 5G communication network. The interface between UE 130 and (R)AN is either an air interface when the access network 131 is a wireless network or wired when the access network is a wired network.

The Access and Mobility Management Function (AMF) block 140 represents the access and mobility management function. It manages the access and mobility functions of the UE. The AMF may also include network slice selection functionality. For wireless access, mobility management is not needed.

The Session Management Function (SMF) block 141 represents the session management function. It sets up sessions and manages them according to the network policy.

The User Plane Function (UPF) block 132 represents the User Plane function. UPFs can be applied in various configurations and locations, according to the service type.

The Policy Control Function (PCF) block 142 represents the policy control function. It provides a policy framework that includes network slicing, roaming, and mobility management. This corresponds to the functionality of a PCRF in 4G systems.

The block UDM (Unified Data Management) 152 provides a shared data management. This saves subscriber data and profiles. This is equivalent to the functionality of an HSS in 4G systems, but is used for both mobile and wired access in the NG Core network.

The block DN (Data Network) 133 provides the data network over which data is transmitted, e.g. from one UE to another UE.

The block AUSF (Authentication Server Function) 151 provides authentication functionality with which the subscriber or the UE can log on to the network.

The AF (Application Function) block 151 provides application functions that enable certain services to be executed.

The NSSF block (Network Slice Selection Function) 150 provides functions to select particular network slices.

The 5G system architecture shown in FIG. 1 represents the structure of the NG (Next Generation) network, which includes network functions (NFs) and reference points connecting the NFs. The UE 130 is connected to either a Radio Access Network (RAN) 131 or an Access Network (AN) 131. In addition, the UE 130 is connected to the Access and Mobility Function (AMF) 140. The RAN 131 represents a base station using new RAT and advanced LTE technologies, while the AN 131 is a general base station with non-3GPP access, e.g. a WiFi Access Point. The Next Generation core network 100 includes various network functions (NFs). In FIG. 1, there are seven Next Generation core NFs, namely (1) AMF 140, (2) Session Management Function (SMF) 141, (3) Policy Control Function (PCF) 142, (4) Application Function (AF) 143, (5) Authentication Server Function (AUSF) 151, (6) User Plane Function (UPF) 132, and (7) User Data Management (UDM) 152.

The network function (NF) represents the processing function inherited from 3GPP in NextGen or NG. It has both functional behavior and serves as an interface. An NF can either be implemented as a network element (or network entity) on dedicated hardware, as a software instance on dedicated hardware, or instantiated as a virtualized function on a suitable platform, e.g. B. a cloud infrastructure.

The AMF 140 provides UE-based authentication, authorization, mobility management, etc. A UE 130 is basically connected to a single AMF 140 because the AMF 140 is independent of the access technology. That means, also a UE 130 with multiple access technologies is only connected to a single AMF 140.

The SMF 141 is responsible for session management and assigns IP addresses to the UEs 130. In addition, the SMF 141 selects the UPF 132 and controls the UPF 132 for data transfer. If a UE 130 has multiple sessions, different SMFs 141 may be associated with each session to individually control them and possibly provide multiple functionalities per session.

The AF 143 provides information about the packet flow and provides it to the PCF 142, which is responsible for policy control to ensure Quality of Service (QoS). Based on this information, PCF 142 will determine the Mobility and Session Management policies for the AMF 140 and SMF 141 to function properly.

The AUSF 151 stores data for authentication of the UE 130 while the UDM 152 stores subscription data of the UE 130. The data network DN 133, which is not part of the NG core network 100, provides Internet access and operator services.

The architectural reference point view can be used to represent detailed message flows in Next Generation (NG) standardization. The reference point Next Generation NG1 101 is defined as transmission signaling between the UE 130 and the AMF 140. The reference points for the connection between the AN 131 and the AMF 140 and between the AN 131 and the UPF 132 are referred to as NG 2 102 and NG3 103. There is no reference point between the AN 131 and the SMF 141, but there is a reference point, NG11 111, between the AMF 140 and the SMF 141. This means that the SMF 141 is controlled by the AMF 140. NG4 104 is used by the SMF 141 and the UPF 132 to allow the UPF 132 to be set with the generated control signal from the SMF 141, and the UPF 132 can report its status to the SMF 141. NG9 109 is the reference point for the connection between different UPFs 132 and NG14 114 is the reference point between different AMFs 140. NG15 115 and NG7 107 are defined in order for PCF 142 to apply its policies to AMF 140 and SMF 141, respectively. NG12 112 is required for the AMF 140 to perform authentication of the UE 130. NG8 108 and NG10 110 are defined because the subscription data of UE 130 is needed by AMF 140 and SMF 141.

The Next Generation Network 100 aims to realize a separation of user and control or control level. The user level transmits the user traffic, while the control level transmits the signaling on the network. In FIG. 1, the UPF 132 is in the user plane and all other network functions, i.e. AMF 140, SMF 141, PCF 142, AF 143, AUS 151 and UDM 152 are in the control plane. Separation of user and control planes guarantees independent scaling of resources at each network level. The separation also allows the provision of UPFs 132 in a distributed manner separate from the functions of the control plane.

The NG Architecture 100 includes modularized functions. For example, AMF 140 and SMF 141 are independent functions in the control plane. Separate AMF 140 and SMF 141 allow independent development and scaling. Other control plane functions such as PCF 142 and AUSF 151 may be separated as shown in FIG. 1. The modularized functional design illustrated in FIG. 1 also enables the Next Generation Network 100 to flexibly support various services.

Each network function interacts directly with another NF. At the control level, a series of interactions between two NFs are defined as a service, so that they can be reused. This service allows support for modularity. The user level supports interactions such as forwarding operations between different UPFs 132.

The Next Generation Network 100 supports roaming similar to EPS (Enhanced Packet Switching). There are two types of application scenarios, Home Routed (HR) and Local Breakout (LBO). The structures that support roaming and the corresponding session management according to the concept presented here will be described in more detail below.

Figure 2:
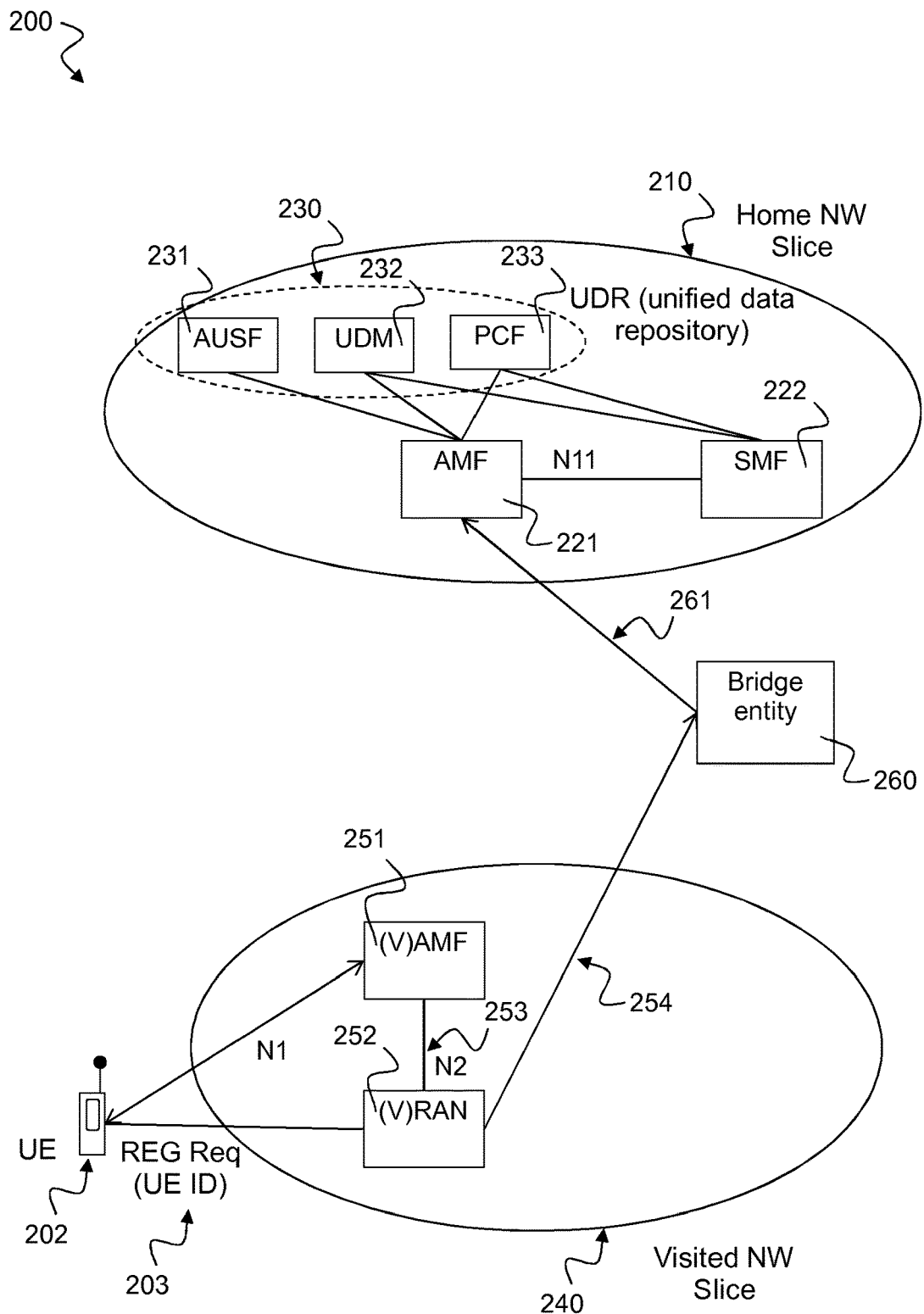
FIG. 2 shows a schematic diagram illustrating an exemplary roaming scenario for a 5G communication network 200 with visited communication network slice 240 and home communication network slice 210 and bridge entity 260.

FIG. 2 shows a schematic diagram illustrating an exemplary roaming scenario for a 5G communication network 200 with visited communication network slice 240 and home communication network slice 210 and bridge entity 260 according to the disclosure.

The 5G communication network 200 is divided into a home network slice 210, e.g. a network slice of a home PLMN (Public Land Mobile Network) and a visited network slice 240, e.g. a network slice of a visited PLMN. Both networks 210, 240 have the same structure as generally described above in FIG. 1, for the sake of clarity not all network elements are shown in detail. In particular, the visited network slice 240 includes an AMF network element 251, also referred to herein as (V) AMF, having the same functionality and interfaces as the AMF 140 described above with respect to FIG. 1. The visited network slice 240 further includes a radio access network (RAN) element 252, also referred to herein as (V) RAN, having the same functionality and interfaces as the RAN 131 described above with reference to FIG. 1.

The same network elements (with the same functionalities and interfaces) also include the home network slice 210, i.e. an AMF network element 221, an SMF network element 222 and a database UDR 230 with the network elements AUSF 231, UDM 232 and PCF 233. The home network slice 210 is the network slice of the home PLMN in which the communication terminal or the user of the communication terminal is registered, i.e. where he has a contract with the network operator. The visited network slice 240 is the network slice of the visited PLMN in whose network coverage the communication terminal or its user is currently residing and via which the user has communicated, i.e. wants to establish a roaming connection. Both, the visited PLMN and the home PLMN may include a plurality of network slices. For simplicity reasons, only one network slice is depicted in FIG. 2 for both, the visited PLMN and the home PLMN.

The communication system 200 depicted in FIG. 2 may be for example a 5G communication system. The communication system 200 includes at least one visited network slice 240 comprising a visited network access entity 251, e.g. a visited radio access network (RAN) entity, e.g. a RAN entity 131 described above with respect to FIG. 1. The communication system 200 further includes a home network slice 210 comprising a home network access entity 221, e.g. a home AMF entity, e.g. an AMF entity 140 as described above with respect to FIG. 1. The communication system 200 further includes a bridge entity 260 coupled between the visited network access entity 251 and the home network access entity 221. The bridge entity 260 is configured to route a registration request message 203 of the roaming UE 202 received from the visited network access entity 251 to the home network access entity 221.

The bridge entity 260 can be a central entity located at a central location of the communication system 200. Alternatively, the bridge entity 260 can be an intermediate entity located between the at least one visited network slice 240 and the home network slice 210.

The visited network access entity 252 may include a routing table configured to forward the registration request message 203 based on an identity (UE ID) of the UE 202. Such UE ID may be included in the registration request message 203 and/or can be a public land mobile network identity (PLMN ID) derived from the UE ID.

The routing table may include one or more internal routes 253 for routing messages from UEs 202 that are configured for the at least one visited network slice 240, i.e. UEs 202 which home network or home network slice is the visited network slice 240 and an external route 254 for routing messages from UEs 202 that are not configured for the at least one visited network slice 240.

The internal route 253 may include a route within the at least one visited network slice 240, for example a route to a visited AMF entity 251 of the at least one visited network slice 240. The external route 254 may include a route to the bridge entity 260.

The routing table may comprise a first internal route for routing messages from UEs 202 that are configured for a first visited network slice 240 of the at least one visited network slice 240 and a second internal route for routing messages from UEs 202 that are configured for a second visited network slice of the at least one visited network slice 240. The first internal route may be different from both, the second internal route and the external route 254. That means, the visited network access entity 252 may route or forward request messages from UEs of different slices of the visited network and may additionally route request messages from roaming UEs that are directed to the home network slice.

The registration request 203 may further include an identification of a specific service which the communication terminal 202 requests from the visited network slice 240. The specific service may be provided by the visited PLMN based on the identification of the specific service if the visited PLMN supports the specific service. Otherwise, if the visited PLMN does not support the specific service, the network entity (251 or 252) may transmit a PLMN ID of another communication network to the UE supporting the specific service.

The registration request 203 may further include a key for authenticating the communication terminal 202. The network entity (251 and/or 252) may authenticate the communication terminal 202 via an authentication entity 231 of the home communication network 210 based on the key.

The bridge entity 260 may include a routing table configured to forward the registration request message 203 based on the identity (UE ID) of the UE 202 and/or based on the PLMN ID to the home network slice 210.

The bridge entity 260 may be configured to route the registration request message 203 based on a network address, in particular an IP address or a MAC address of the roaming user equipment (UE) 202.

The bridge entity 260 can provide a database service, e.g. a domain name service (DNS) or a dynamic host configuration protocol (DHCP) service, that is configured to resolve the registration request message 203 of the roaming user equipment (UE) 202 to provide an address of the corresponding home network slice 210.

The bridge entity 260 may further be configured to provide a mapping of routable addresses of at least one home network slice 210 and at least one visited network slice 240 which are coupled to the bridge entity 260.

The bridge entity 260 may include the functionality of a visited AMF entity 251 of the at least one visited network slice 240 and/or can be collocated with the visited AMF entity 251.

The bridge entity 260 may include a data caching functionality, in particular for caching subscriber data of the UE received from the home network slice 210.

The communication system 200 includes a visited network access entity 300, e.g. a radio access network (RAN) entity of a visited network slice 240. The visited network access entity 300 may include a routing table 301 comprising at least one internal route 253 for routing messages from non-roaming UEs 202 to a network entity 251 of the visited network slice 240 and an external route 254 for routing messages from roaming UEs 202 to the bridge entity 260. The visited network access entity 300 may further include a processor 302 configured to forward an incoming registration request message 203 from a UE 202 based on looking up the routing table 301 with respect to an identity (UE ID) of the UE 202 comprised in the registration request message 203 and/or a public land mobile network identity (PLMN ID) derived from the UE ID.

Such a communication system 200 that can be a 5G communication system comprises at least one visited network slice 240 which comprises a visited network access entity 252 as described above with respect to FIG. 2. The communication system 200 further includes at least one home network slice 210 as described above with respect to FIG. 2. The communication system 200 further includes a bridge entity 260 as described above with respect to FIG. 2, which is configured to route a registration request message 203 of a roaming user equipment (UE) 202 received from the at least one visited network slice 240 to the at least one home network slice 210 according to the routing table.

In the following, an exemplary functionality of the communication system 200 is described.
1) V RAN 252 routes to central instance (bridge) 260.
2) central instance 260 is a kind of database (e.g., Domain Name Server (DNS)), which reads out all PLMN IDs, and specifies addresses where to route.
3) The central instance 260 can be a bridge AMF and can take over the tasks of the VAMF 251.
4) The central instance 260 provides information for all networks.
5) The central instance 260 can route by using user IDs, e.g. IP address of the user.
6) The central instance 260 uses the IP addresses to identify which home network element (for example, UDR 230) needs to be routed or roamed.
7) The central entity 260 offers a data cache functionality (e.g. for subscriber data).

This functionality provides the following advantages: The central instance 260 enables a faster acquisition of the subscriber data in the roaming case as well as easier maintenance or update of the entities. For example, the bridge instance 260 can be updated at any time, for example to add additional slice IDs.

Figure 3:
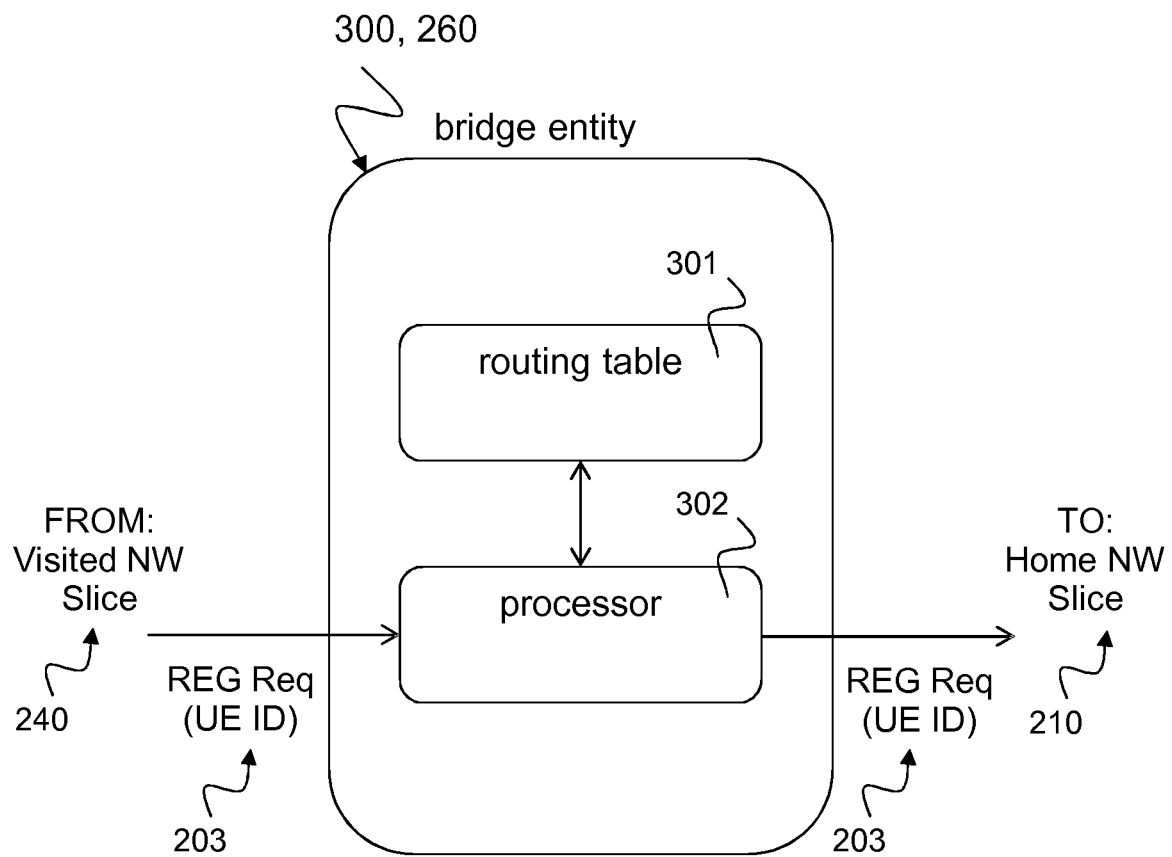
FIG. 3 shows a block diagram of an exemplary bridge entity 260 according to the disclosure.

FIG. 3 shows a block diagram of an exemplary bridge entity 260 according to the disclosure. The bridge entity 260 can be connected between a plurality of visited network slices 240 and a plurality of home network slices 210. The bridge entity 260 comprises a routing table 301 and a processor 302.

The routing table 301 is configured to provide a plurality of routes between the visited network slices 240 and the home network slices 210. The processor 302 is configured to route a registration request message 203 of a roaming user equipment (UE) 202 received from a visited network slice 240 of the plurality of visited network slices to a corresponding home network slice 210 of the plurality of home network slices based on the routing table.

The processor 302 may be configured to determine the corresponding home network slice 210 based on an identity (UE ID) of a UE 202, in particular a network address of the UE 202, comprised in the registration request message 203 and/or a public land mobile network identity (PLMN ID) derived from the UE ID.

The bridge entity 260 may be implemented in hardware or software, for example as a silicon chip designed to implement the above-described functionality or as a database function in a software implementation, e.g. as described above.

Figure 4:
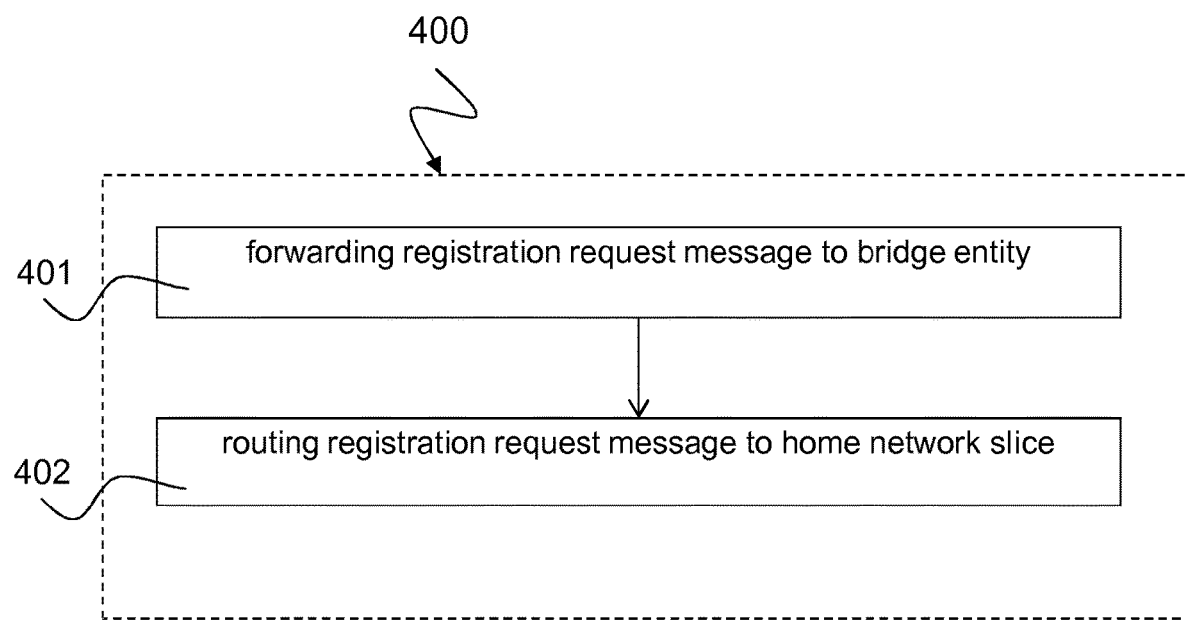
FIG. 4 shows a schematic diagram illustrating an exemplary method 400 for routing a registration request message from a roaming user equipment (UE) according to the disclosure.

FIG. 4 shows a schematic diagram illustrating an exemplary method 400 for routing a registration request message from a roaming user equipment (UE) according to the disclosure.

In a first step 401, the method 400 includes: forwarding a registration request message 203 from a roaming user equipment (UE) 202 by a visited network access entity 251, in particular a visited radio access network (RAN) entity, to a bridge entity 260, e.g. as described above with respect to FIGS. 2 and 3.

In a second step 402, the method 400 includes: routing the registration request message 203 by the bridge entity 260 to a home network access entity 221 of a home network slice 210 of the roaming UE 202.

The method 400 may include further steps, such as, for example, according to the method steps described above with reference to FIGS. 2 and 3.

Another aspect of the invention is related to a computer program product comprising program code for performing the method 400 or the functionalities described above, when executed on a computer or a processor. The method 400 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A 5G communication system, comprising:
at least one visited network slice comprising a visited radio access network (RAN) entity;
a home network slice comprising a home Access and Mobility Management Function (AMF) entity; and
a bridge entity coupled between the visited RAN entity and the home AMF entity, wherein the bridge entity is configured to route a registration request message of a roaming user equipment (UE) received from the visited RAN entity to the home AMF entity;
wherein the visited RAN entity comprises a routing table configured to forward the registration request message based on a UE identity (UE ID) comprised in the registration request message and/or a public land mobile network identity (PLMN ID) derived from the UE ID;
wherein the routing table comprises a first internal route for routing messages from UEs that are configured for a first visited network slice of the at least one visited network slice, a second internal route for routing messages from UEs that are configured for a second visited network slice of the at least one visited network slice, and an external route for routing messages from UEs that are not configured for the at least one visited network slice;
wherein the first internal route is different from both the second internal route and the external route.

2. The 5G communication system of claim 1, wherein:
the bridge entity is a central entity located at a central location of the communication system; or
the bridge entity is an intermediate entity located between the at least one visited network slice and the home network slice.

3. The 5G communication system of claim 1, wherein the routing table further comprises a route to a visited AMF entity of the at least one visited network slice; and
wherein the external route comprises a route to the bridge entity.

4. The 5G communication system of claim 1, wherein the bridge entity comprises a routing table configured to route the registration request message based on the UE ID and/or based on the PLMN ID to the home network slice and/or based on an IP address or a media access control (MAC) address of the UE.

5. The 5G communication system of claim 1, wherein the bridge entity is configured to provide a domain name service (DNS) or a dynamic host configuration protocol (DHCP)

service configured to resolve the registration request message of the roaming UE providing an address of the corresponding home network slice.

6. The 5G communication system of claim 1, wherein the bridge entity is configured to provide a mapping of routable addresses of at least one home network slice and at least one visited network slice which are coupled to the bridge entity.

7. The 5G communication system of claim 1, wherein the bridge entity comprises functionality of a visited AMF entity of the at least one visited network slice and/or is collocated with the visited AMF entity.

8. The 5G communication system of claim 1, wherein the bridge entity is configured to cache subscriber data received from the home network slice.

9. A visited radio access network (RAN) entity, the visited RAN entity comprising:
  a routing table, wherein the routing table comprises a first internal route for routing messages from user equipments (UEs) that are configured for a first visited network slice of at least one visited network slice, a second internal route for routing messages from UEs that are configured for a second visited network slice of the at least one visited network slice, and an external route for routing messages from UEs that are not configured for the at least one visited network slice, and wherein the first internal route is different from both the second internal route and the external route; and
  a processor configured to forward an incoming registration request message from a UE based on looking up, using the routing table, a UE identity (UE ID) comprised in the registration request message and/or a public land mobile network identity (PLMN ID) derived from the UE ID.

10. A method for routing a registration request message from a roaming user equipment (UE), the method comprising:
  forwarding, by a visited radio access network (RAN) entity, the registration request message from the roaming UE to a bridge entity using a routing table of the visited RAN entity, wherein the routing table comprises a first internal route for routing messages from UEs that are configured for a first visited network slice of at least one visited network slice, a second internal route for routing messages from UEs that are configured for a second visited network slice of the at least one visited network slice, and an external route for routing messages from UEs that are not configured for the at least one visited network slice, and wherein the first internal route is different from both the second internal route and the external route; and
  routing, by the bridge entity, the registration request message to a home network access entity of a home network slice of the roaming UE.

* * * * *